(12) United States Patent
Han

(10) Patent No.: US 12,422,344 B2
(45) Date of Patent: Sep. 23, 2025

(54) SPECIMEN TESTING MACHINE

(71) Applicant: Sang Nim Han, Daejeon (KR)

(72) Inventor: Sang Nim Han, Daejeon (KR)

( * ) Notice: Subject to any disclaimer, the term of this patent is extended or adjusted under 35 U.S.C. 154(b) by 374 days.

(21) Appl. No.: 18/033,796

(22) PCT Filed: Nov. 26, 2020

(86) PCT No.: PCT/KR2020/016900
§ 371 (c)(1),
(2) Date: May 5, 2023

(87) PCT Pub. No.: WO2022/092403
PCT Pub. Date: May 5, 2022

(65) Prior Publication Data
US 2023/0393043 A1    Dec. 7, 2023

(30) Foreign Application Priority Data
Oct. 29, 2020   (KR) .................... 10-2020-0141663

(51) Int. Cl.
*G01N 3/04*   (2006.01)
*G01N 3/08*   (2006.01)
(Continued)

(52) U.S. Cl.
CPC ................. *G01N 3/04* (2013.01); *G01N 3/08* (2013.01); *G01N 3/20* (2013.01); *G01N 3/32* (2013.01);
(Continued)

(58) Field of Classification Search
CPC .. G01N 3/04; G01N 3/08; G01N 3/20; G01N 3/32; G01N 2203/0016; G01N 2203/0282;
(Continued)

(56) References Cited

U.S. PATENT DOCUMENTS

| 10,094,752 B2 * | 10/2018 | Okazaki ................... G01N 3/20 |
| 2011/0248739 A1 * | 10/2011 | Kim ....................... G01M 5/005 |
| | | 324/762.01 |

(Continued)

FOREIGN PATENT DOCUMENTS

| KR | 10-2013-0111786 A | 10/2013 |
| KR | 10-1375077 B1 | 3/2014 |

(Continued)

OTHER PUBLICATIONS

International Search Report for PCT/KR2020/016900 mailed Jul. 29, 2021 from Korean Intellectual Property Office.

*Primary Examiner* — Jonathan M Dunlap
(74) *Attorney, Agent, or Firm* — Revolution IP, PLLC

(57) ABSTRACT

The present disclosure relates to a specimen testing machine which includes: a specimen test unit comprising: a pair of gripper parts configured to respectively hold opposite ends of a specimen, a gripper fixing part configured to fix at least any one of the pair of gripper parts, and a specimen driving part configured to move the specimen in a longitudinal direction of the specimen; and a guide plate unit including: a guide plate that is configured to be moved along with a folding direction of the specimen, and to be folded at a center portion thereof, and a second driving part comprising a second fixing part configured to fix opposite ends of the guide plate, and configured to move the specimen in the longitudinal direction of the specimen.

6 Claims, 8 Drawing Sheets

(51) Int. Cl.
*G01N 3/20* (2006.01)
*G01N 3/32* (2006.01)

(52) U.S. Cl.
CPC .............. *G01N 2203/0016* (2013.01); *G01N 2203/0017* (2013.01); *G01N 2203/0023* (2013.01); *G01N 2203/0026* (2013.01); *G01N 2203/025* (2013.01); *G01N 2203/0282* (2013.01); *G01N 2203/04* (2013.01); *G01N 2203/0435* (2013.01)

(58) Field of Classification Search
CPC ... G01N 2203/0435; G01N 2203/0017; G01N 2203/0023; G01N 2203/0026; G01N 2203/025; G01N 2203/04; G01M 5/005; G01M 99/007
See application file for complete search history.

(56) References Cited

U.S. PATENT DOCUMENTS

| | | | |
|---|---|---|---|
| 2016/0103048 A1* | 4/2016 | Okazaki | G01N 3/32 73/849 |
| 2021/0140863 A1 | 5/2021 | Okazaki et al. | |

FOREIGN PATENT DOCUMENTS

| | | | |
|---|---|---|---|
| KR | 10-1422103 B1 | 7/2014 | |
| KR | 101527815 B1 * | 6/2015 | ............ G01N 3/04 |
| KR | 10-2016-0000925 A | 1/2016 | |
| KR | 10-1649330 B1 | 8/2016 | |
| KR | 10-2020-0065606 A | 6/2020 | |
| KR | 10-2148888 B1 | 10/2020 | |
| WO | 2018-155723 A1 | 8/2018 | |

* cited by examiner (a)

(b)

SPECIMEN TESTING MACHINE

TECHNICAL FIELD

The present disclosure relates to a specimen testing machine. More particularly, the present disclosure relates to a specimen testing machine capable of a folding test, a tensile test, etc. by holding opposite ends of a flexible element to detect and analyze mechanical flexibility.

BACKGROUND ART

A flexible substrate or a flexible element has a multi-layer structure in which thin films of various materials are layered. The flexible substrate or the flexible element may be applied to a flexible display, a touchscreen, a wearable smart device, a biometric device, a foldable phone, etc.

The evaluation of the service life of a flexible element is performed to evaluate how long the flexible element will run when combined load such as tension, folding, etc. is repeatedly applied under use conditions such as temperature, humidity, etc. Accordingly, the evaluation of the service life, the prediction of failure rate, or the mechanism in failure occurrence of the flexible element can be determined.

In order to lead the development of materials and parts of flexible elements where technology is rapidly changing as a future growth industry, the rapid evaluation of the service life of flexible elements considering the actual use environment that has high reliability/long-life is essential.

In the case of a folding test of the flexible element, bending stress, etc. can be calculated through a two-point folding test. In other words, opposite ends or one end of the flexible element (hereinbelow, which will be referred to as a specimen) is moved inward so as to reduce an initial distance between the opposite ends, thereby applying the bending stress to the specimen.

The maximum bending stress ($\sigma_{max}$) generated on a neutral surface (neutral axis) of the specimen may be calculated by the following equation (1) (reference, 45.2: Two Point Bending of Thin Glass Substrate; SID Symposium Digest of Technical Paper; Suresh T. Gulati et al; June 2011 and Strength Measurement of Optical Fibers by Bending, M. J. Matthewson and C. R. Kurkjian, J. Am. Ceram. Soc., 69, 815-821, 1986).

$$\sigma_{max} = K\left(\frac{Et}{D-t}\right)\sqrt{\cos\psi} \quad \text{[Equation 1]}$$

At this point, K is a test constant, E is the Young's modulus of a material or a part, t is a thickness of the specimen, D is a length of the specimen, and $\psi$ is a contact angle. When the specimen has a long length, $\psi$ may be 0.

Meanwhile, the bending stress generated inside or outside of the neutral surface is reduced according to a normal angle and calculated by the equation (2).

$$\sigma_{bend} = \sigma_{max} \sin\theta, (90° \leq \theta \leq 180°) \quad \text{[Equation 2]}$$

At this point, $\theta$ is an angle with respect to a radius of curvature (R) generated by folding of the specimen and a vertical axis, and is changed between 90 degrees in which the maximum stress is generated and 180 degrees in which the contact angle is in parallel to the specimen. At this point, 'curvature' means the degree to which a circle is folded, and a length between a curved surface and the center of the circle is the radius of the circle, and the length is called as 'radius of curvature' (reference: https://blog.lgdisplay.com/2016/05/radius-curvature/).

This equation is true only when the specimen is rotated while opposite ends thereof are not restrained. As disclosed in patent document No. 10-1422103, this equation is not true when the opposite ends of the specimen are restrained. A folding angle Y proposed in FIG. 3 of Suresh T. Gulati et al is required as the opposite ends of the specimen are freely folded continuously smooth. However, when the specimen is folded while the opposite ends of the specimen is held (restrained), it may be difficult to apply the given equation.

Furthermore, as described in the following patent documents No. 10-2013-0111786 and No. 10-1649330, during a specimen test, when the folding test is performed only in one direction, it is difficult to perform the correct service life evaluation.

Meanwhile, recently, it was revealed that the foldable organic light emitting diode (OLED) with the radius of curvature at 1.4R was commercialized. It was reported that the foldable OLED passed stably the folding test 200,000 times. A value of 1.4R for the radius of curvature means that a panel is folded enough to wrap a cylinder with the radius of 1.4 mm. The smaller a value of R, the flatter the foldable OLED is folded (source: https://www.kipost.net/news/articleView.html?idxno=205449).

However, as disclosed in patent document No. 10-2013-0111786, when the folding test is performed, even when the specimen is folded until the opposite ends of the specimen are brought into contact with each other, the concentration of stress is not generated at the center portion of the specimen and it is difficult to perform the correct evaluation of service life. In other words, even when a gripper part is maximally moved, the radius of curvature at the center portion of the folded specimen is subject to a large value. In order to perform the correct folding test, the radius of curvature at the center portion of the specimen is formed narrow so that the correct folding test should be performed. For example, in order to promote reduction of the radius of curvature at the center portion of the specimen and generation of maximum stress at the center portion of the specimen, as disclosed in No. 10-1649330, a guide 137, 138 is provided. However, it is required to promote the generation of the maximum stress through the formation of a smaller radius of curvature at the center portion of the specimen.

DISCLOSURE

Technical Problem

The present disclosure is intended to calculate the maximum bending stress without restraining opposite ends of a specimen during a two points folding test, to present a reasonable structure that can form a micro radius of curvature at a center portion of the specimen, and to control a folding direction of the specimen.

Moreover, the present disclosure is intended to perform a tensile test together with a folding test of the specimen together.

Technical Solution

The present disclosure includes a specimen testing machine including: a specimen test unit including: a pair of gripper parts configured to respectively hold opposite ends of a specimen, a gripper fixing part configured to fix at least any one of the pair of gripper parts, and a specimen driving part configured to move the specimen in a longitudinal direction of the specimen; and a guide plate unit including: a guide plate that may be configured to be moved along with a folding direction of the specimen, and to be folded at a center portion thereof, and a second driving part including a second fixing part configured to fix opposite ends of the guide plate, and configured to move the specimen in the longitudinal direction of the specimen.

The specimen test unit may include a tilting part coupled to a first side end of each of the gripper parts, and configured to control the folding direction of the specimen.

The guide plate may be provided at each of opposite sides based on the specimen.

A rotary shaft of each of the gripper parts and a rotary shaft of the guide plate may be spaced apart from each other by a predetermined distance.

One side end of the gripper fixing part may have a contact part that may be in contact with one side end of a shaft fixing the guide plate so as to allow the guide plate to be moved together with movement of the specimen driving part.

A protrusion part may be provided on one surface of the guide plate that may be in contact with one surface of the specimen.

Advantageous Effects

The present disclosure can calculate the maximum bending stress without restraining the opposite ends of the specimen during a two-point folding test. The present disclosure can present a reasonable structure that can form a micro radius of curvature at the center portion of the specimen, and the reasonable and objective evaluation of the service life can be achieved by controlling the folding direction of the specimen.

Moreover, the tensile test can be performed together with the folding test of the specimen.

MODE FOR INVENTION

The present disclosure includes a specimen test unit 1000 holding opposite ends of a specimen to allow a folding and tensile test of the specimen and a guide plate unit 2000 adjusting a folding direction of the specimen during the folding test of the specimen and forming a micro radius of curvature at a center portion of the specimen.

Hereinbelow, the present disclosure will be described in detail with reference to accompanying drawings.

[Specimen Test Unit 1000]

Figure 1:
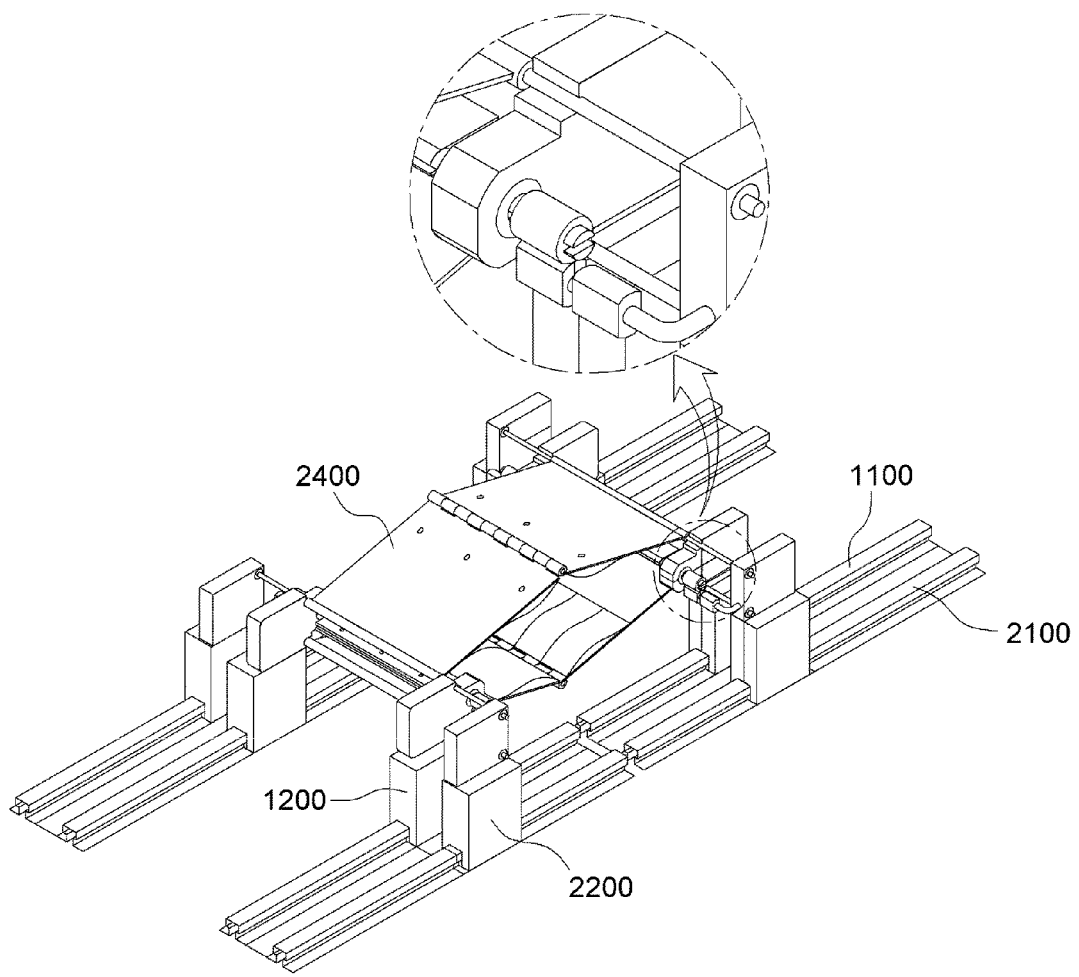
FIG. 1 is a schematic view showing a specimen testing machine according to the present disclosure
Figure 2:
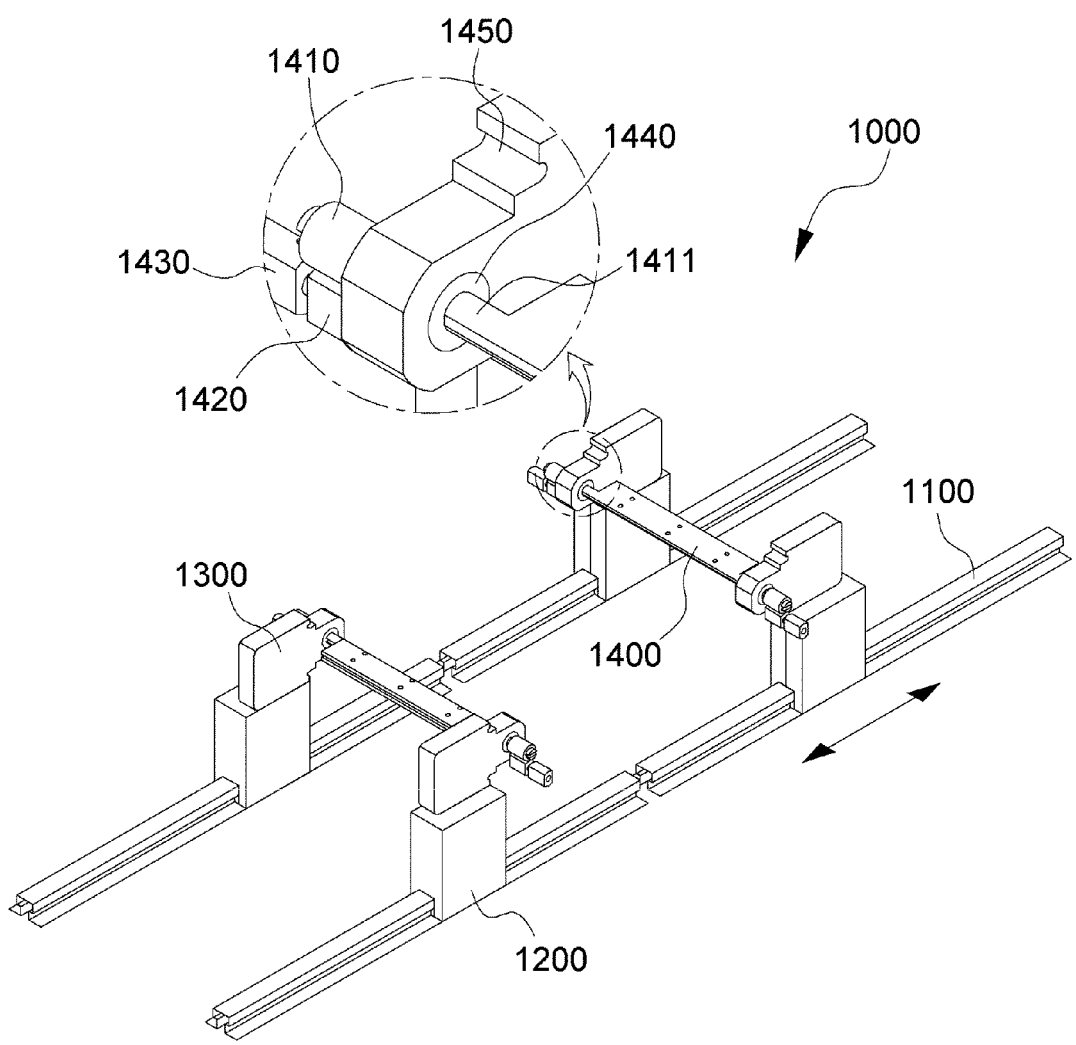
FIG. 2 is a schematic view showing a specimen test unit of the specimen testing machine according to the present disclosure
Figure 4:
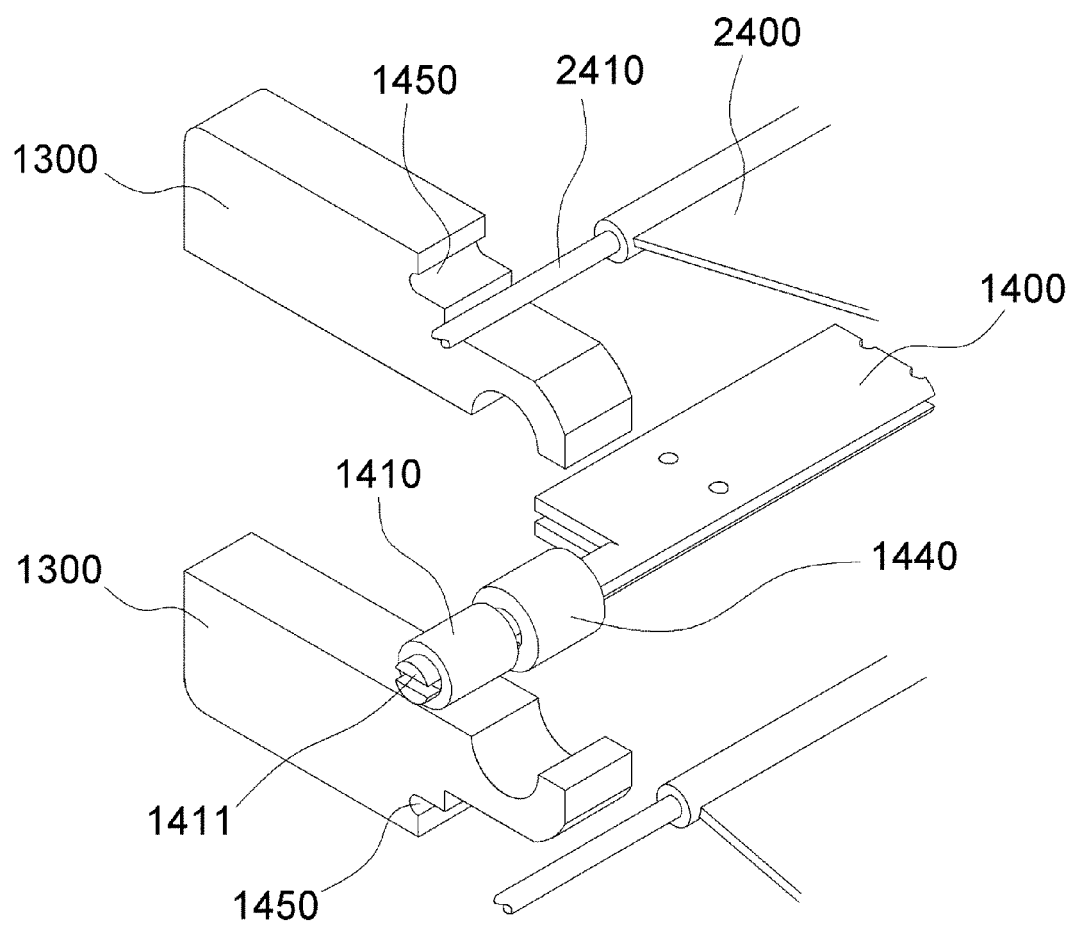
FIG. 4 is a schematic view showing a gripper fixing part of the specimen testing machine according to the present disclosure

Referring to FIGS. 1, 2, and 4, the specimen test unit 1000 will be described in detail.

The specimen test unit 1000 includes a specimen rail 1100, a specimen driving part 1200 moved linearly along the specimen rail 1100, a gripper fixing part 1300 disposed at an upper portion of the specimen driving part 1200 and fixing a rotary shaft of a gripper rotatably, the gripper 1400 holding each of opposite ends of the specimen, etc.

A usual linear motion guide, etc. may be used as the specimen rail 1100 and the specimen driving part 1200, and it is fine to have a structure similar to the linear motion guide. This structure is provided to move the specimen in a longitudinal direction to allow a folding test or a tensile test.

Figure 7:
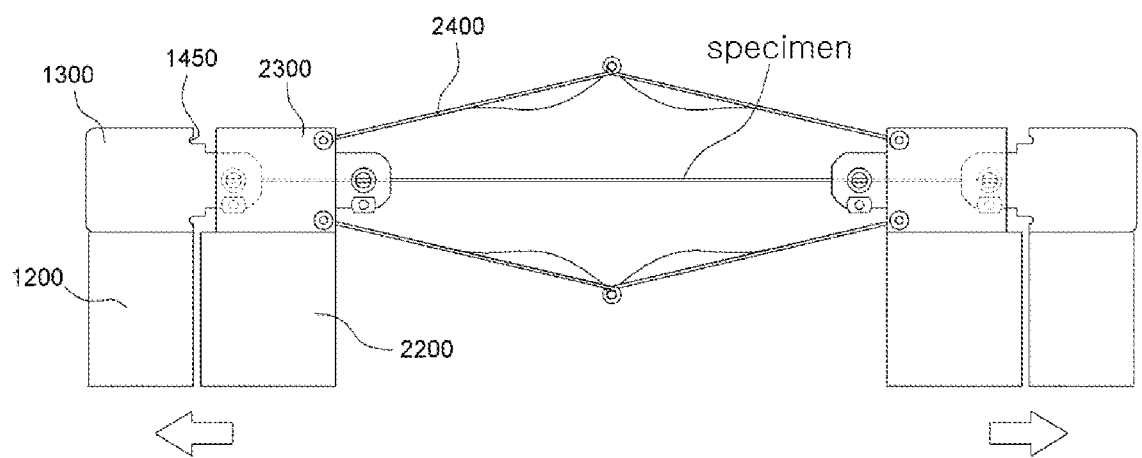
FIG. 7 is a schematic view showing a process of a tensile test of the specimen testing machine according to the present disclosure
Figure 8:
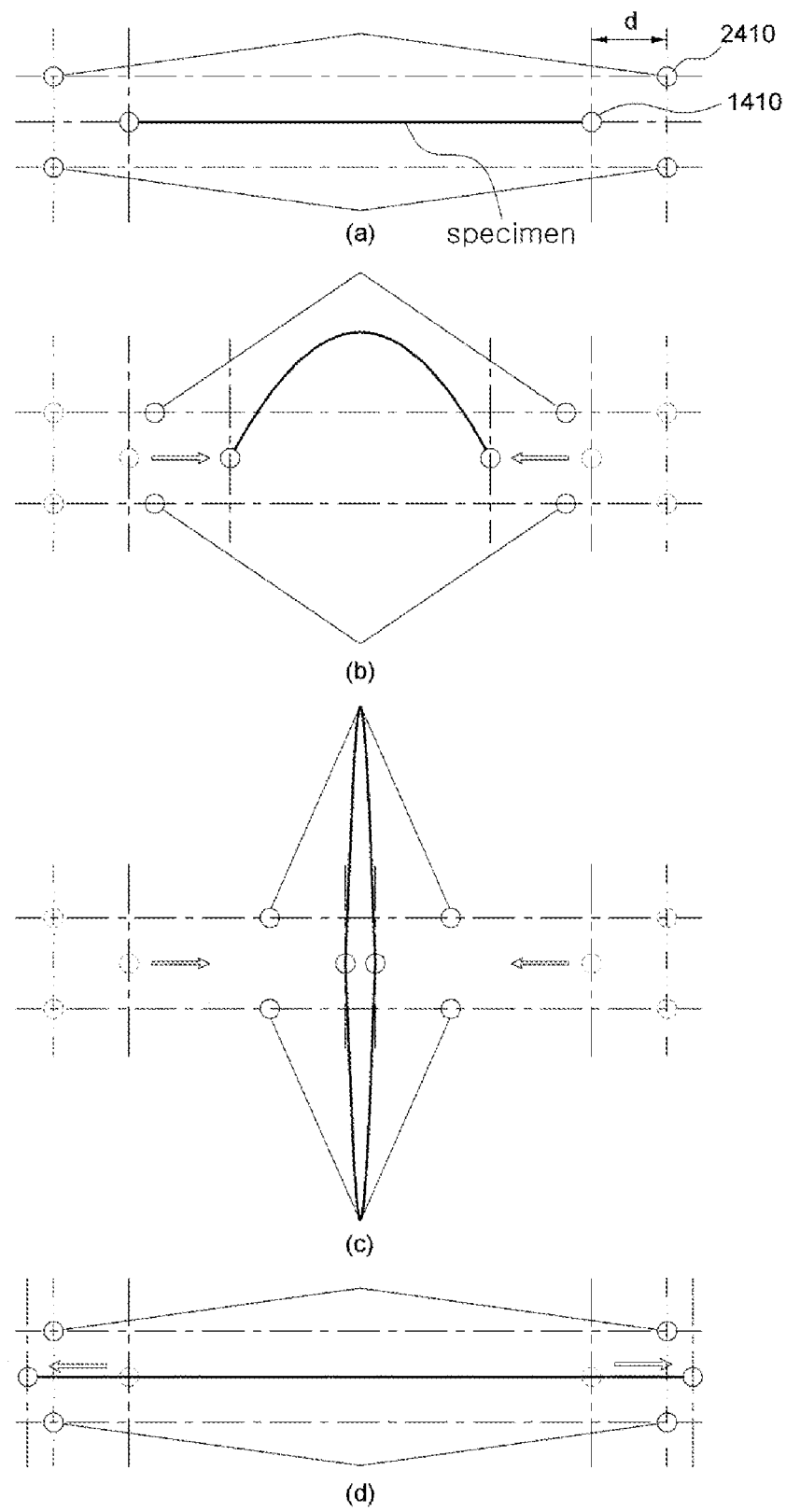
FIG. 8 is a schematic view showing a process of a folding and tensile test of the specimen testing machine according to the present disclosure.

The gripper fixing part 1300 is disposed at the upper portion of the specimen driving part 1200 and the rotary shaft 1411 of the gripper 1400 is fixed to the gripper fixing part 1300 while being rotatably interposed with a bearing 1440. The bearing 1440 may be a no-load bearing. Referring to FIGS. 1 and 4, a contact part 1450 is provided at one portion or opposite portions of the gripper fixing part 1300, and the contact part 1450 is in contact with a shaft 2410 provided at an end of a guide plate 2400 and allows the guide plate 2400 to be moved together during movement of the specimen driving part 1200. Referring to FIGS. 7 and 8, according to a moving direction of the specimen driving part 1200 during the folding test, a guide driving part 2200 is moved together with the specimen driving part 1200. However, during the tensile test, only the specimen driving part 1200 is moved, but the guide driving part 2200 is fixed at an original position thereof.

Referring to FIGS. 2 and 4, the gripper fixing part 1300 supports and fixes the gripper 1400, so that the rotary shaft 1411 of each of opposite ends of the gripper 1400 is rotated in a no-load operating state while being interposed with the bearing 1440.

Figure 5:
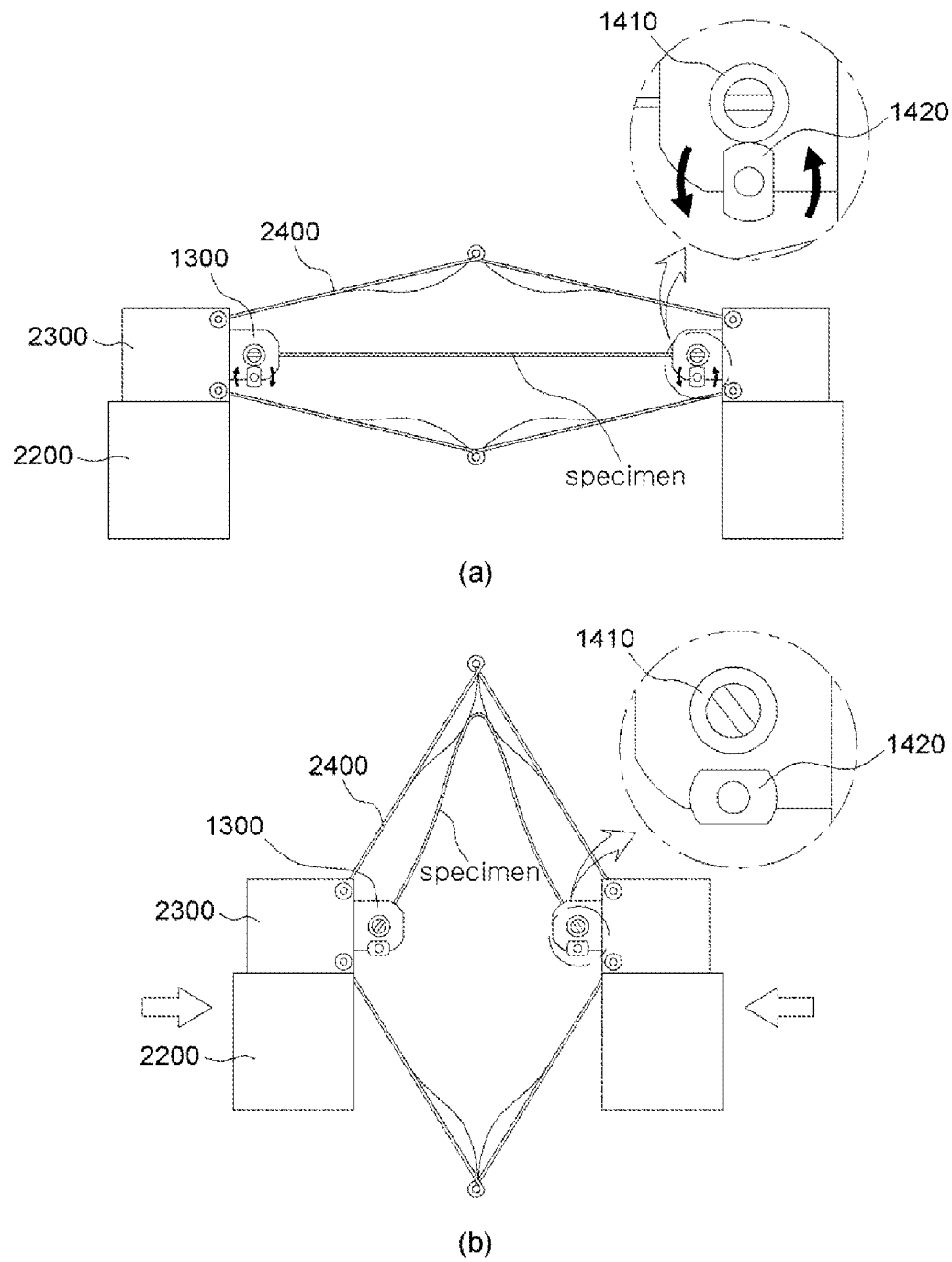
FIGS. 5 and 6 are schematic views each showing a process of a folding test of the specimen testing machine according to the present disclosure

Referring to FIGS. 2 and 4, the gripper 1400 holds each of the opposite ends of the specimen, and the rotary shaft 1411 of each of the opposite ends of the gripper 1400 is fixed to the gripper fixing part 1300 as described above. Meanwhile, a tilting part 1410 is fixed at one end of the rotary shaft 1411. Referring to FIG. 5, the tilting part 1410 is securely fixed to the rotary shaft 1411 to be rotated together with rotation of the rotary shaft 1411. The tilting part 1410 may be made of a polymer material such as rubber, silicone, etc. of non-slip materials. One surface of the tilting part 1410 may be in surface-contact with a power supply part 1420 coupled to one side end of a power unit 1430. The power unit 1430 may be a motor, and it is fine that a power source that can transmit a rotating force to the power supply part 1420 is used as the power unit 1430. The tilting part 1410 in surface-contact with the power supply part 1420 is rotated by corresponding to clockwise or counterclockwise rotation of the power supply part 1420. In response to a rotating direction of the tilting part 1410, a folding direction of the specimen held by the gripper 1400 may be controlled into a downward or upward direction. As shown in FIG. 5, etc., the power supply part 1420 may have a shape of which opposite surfaces are cut (similar to an oval shape). This shape determines momentarily the folding direction of the specimen, and then allows the specimen to be freely bent along movements of the specimen driving part 1200 and the guide driving part 2200.

[Guide Plate Unit 2000]

Figure 3:
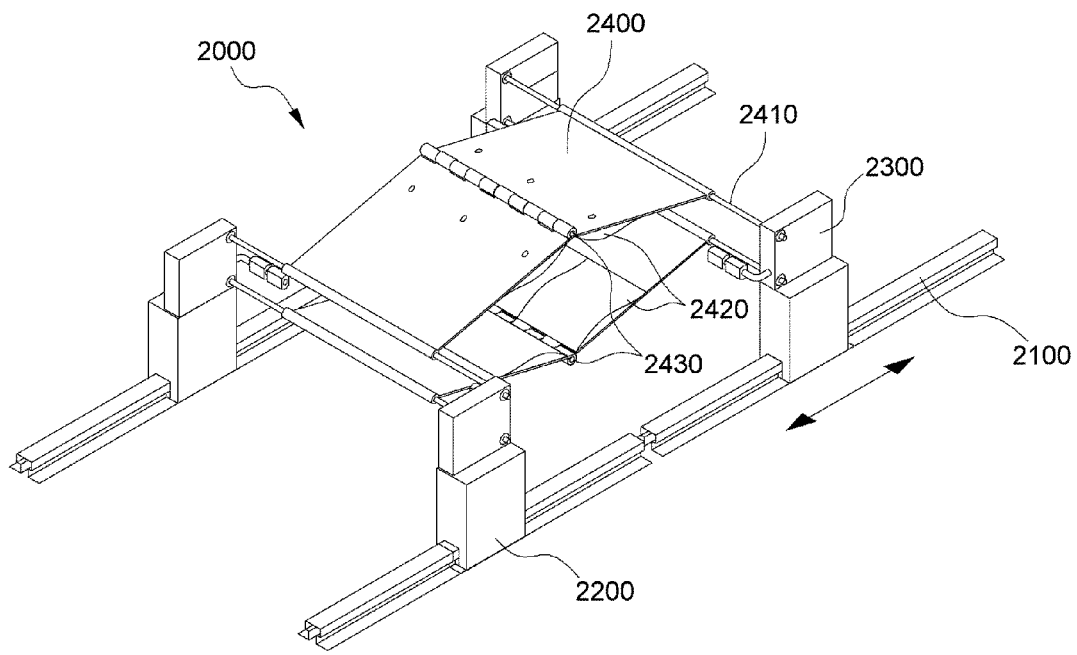
FIG. 3 is a schematic view a guide plate unit of the specimen testing machine according to the present disclosure

Referring to FIGS. 1, 3, and 4, the guide plate unit 2000 will be described in detail.

The guide plate unit 2000 includes a guide rail 2100, the guide driving part 2200 moved linearly along the guide rail 2100, a guide fixing part 2300 disposed at an upper portion of the guide driving part 2200, and fixing the shaft 2410 rotated while being fixed to an end of the guide plate, and the guide plate 2400 adjusting the folding direction and the radius of curvature of the specimen during the folding test of the specimen.

The guide rail 2100 and the guide driving part 2200 may be usual LM guides, etc. as described above, and it is fine that the guide rail 2100 and the guide driving part 2200 are configured to have a structure similar thereto. The guide rail 2100 and the guide driving part 2200 may be disposed in parallel to a side portion of the above-described specimen rail 1100. In FIG. 1, it is shown that the guide rail 2100 is disposed outside the specimen rail 1100.

As shown in FIG. 3, the guide plate 2400 consists of two guide plates 2400 that are divided into opposite sides on the basis of the center shaft 2430 and are coupled to each other. During the folding test, the divided guide plates 2400 are folded against from each other to locate a center portion of the specimen at the folded portion of the divided guide plate 2400, so that the radius of curvature can be formed very little. Additionally, the guide plate 2400 may be symmetrically provided at each of upper and lower sides based on the specimen. This structure is provided to guide the specimen when the folding test is performed for the specimen in both upward and downward directions.

Meanwhile, a curvature radius adjusting part 2420 is provided at an inside surface of the guide plate 2400. The curvature radius adjusting part 2420 is provided to promote concentration of bending stress at the center portion of the specimen. The curvature radius adjusting part 2420 is provided to promote folding with a micro radius of curvature at the center portion of the specimen. The curvature radius adjusting part 2420 may have a coupling structure that may be coupled to and separated from the guide plate 2400.

Even when grippers 1400 at opposite sides of the specimen test unit are brought into contact with each other, since the opposite guide plates 2400 have an angle of 10 degrees or more therebetween due to a geometric assembly structure, a zero radius of curvature cannot be implemented.

In order to reduce the minimum radius of curvature that can be implemented by the geometric assembly structure, to the zero radius of curvature, the present disclosure includes the curvature radius adjusting part 2420 which is attachable and detachable.

[Folding Test Mode]

Figure 6:
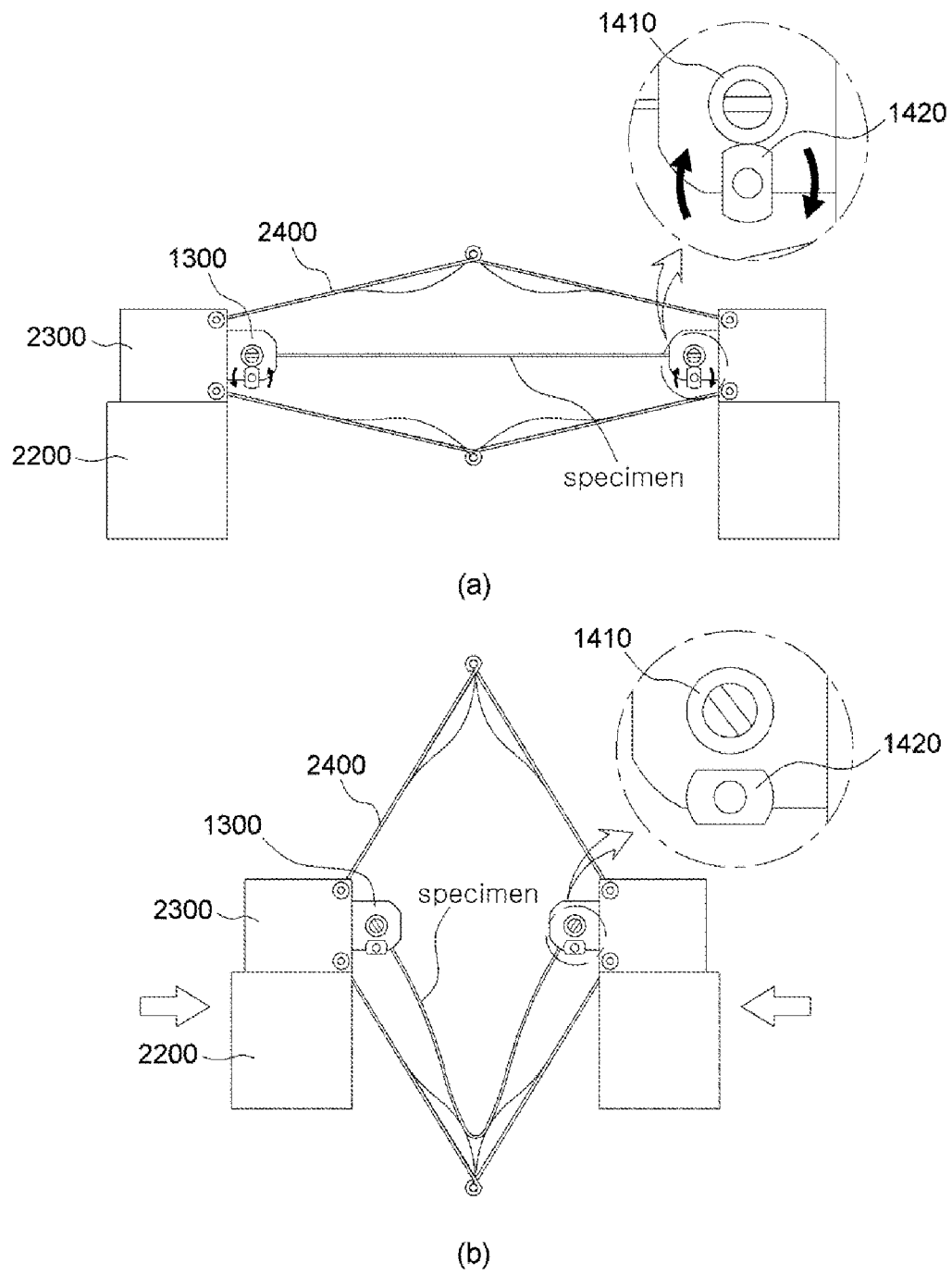

Referring to FIGS. 5, 6, and 8, the folding test will be described. FIG. 5 is a view showing a mode in which the specimen is folded in the upward direction. FIG. 6 is a view showing a mode in which the specimen is folded in the downward direction.

The guide driving part 2200 is moved together with movement of the specimen driving part 1200.

In an initial state as shown in FIG. 5A, the guide driving part 2200 is moved in a direction in which the specimen is folded, together with the specimen driving part 2100. At the same time as the movement, due to one-time counterclockwise rotation of the power supply part 1420, the specimen fixed to the power supply part 1420 is momentarily folded in the upward direction. At the same time as momentary folding of the specimen, the specimen driving part 2100 and the guide driving part 2200 are moved, and the folding test is performed while the folding direction of the specimen is maintained.

As shown in FIG. 5B, the guide plate 2400 is moved corresponding to the folding direction of the specimen, and concentration of the bending stress at the center portion of the specimen can be promoted.

Referring to FIG. 8A, the rotary shaft 1411 and the shaft 2410 are spaced apart from each other by a predetermined distance d. Referring to FIGS. 8B and 8C, during the folding test, the rotary shaft 1411 and the shaft 2410 are moved together. Referring to FIG. 8C, movement continues until rotary shafts 1411 located at opposite ends of the specimen come closer to each other. For example, even when outside portions of the rotary shafts 1411 are brought into contact with each other, the structural problem prevents end portions of the specimen held by the gripper from being brought into contact with each other. There is an advantage that even when the gripper parts are not in contact with each other the guide plate 2400 allows a radius of curvature at the center portion of the specimen to approach to a micro value (to near zero). This is because the center portion of the specimen is located between the folded guide plates 2400. The grippers at the opposite ends of the specimen do not need to come closer to each other (there is no collision between the grippers at the opposite ends), so that the safety, durability, etc. of the specimen testing machine according to the present disclosure can be enhanced.

[Tensile Test Mode]

The tensile test mode will be described with reference to FIGS. 7 and 8.

Referring to FIGS. 7 and 8, in an initial state of the tensile test, the specimen driving part 1200 is moved in a rearward direction so as to pull the specimen. At this point, as the shaft 2410 of the guide plate 2400 in contact with the contact part 1450 is separated from the contact part 1450, the guide driving part 2200 is located at an original location thereof without being moved. This operation is a difference from the folding test in which the guide driving part 2200 is moved together with the specimen driving part 1200.

[Folding-Tensile Combined Fatigue Test Process]

The folding-tensile combined fatigue test process will be described with reference to FIG. 8. After the specimen is held by the gripper 1400, the specimen test unit 1000 and the guide plate unit 2000 are located at the initial state. After then, while the specimen test unit 1000 is moved forward in the folding direction of the specimen, an inward folding test starts (inward folding). As the specimen test unit 1000 is moved forward, gripper fixing parts 1300 at the opposite ends of the specimen are stopped at the maximum proximity values. After the gripper fixing parts 1300 are stopped, the specimen test unit 1000 retreats to the initial position. An inward folding load is released (inward unfolding). As only the specimen test unit 1000 retreats from the initial location to an elongation rate setting location while being separated from the guide plate unit 2000, the tensile test starts (tension loading). After then, the specimen test unit 1000 is moved forward to the initial location to release a tension load (tension unloading.

After then, the specimen test unit 1000 is moved forward in the folding direction of the specimen, and an outward folding test (outward folding) starts with switching the folding direction. As the specimen test unit 1000 is moved forward, the gripper fixing parts 1300 at the opposite ends of the specimen are stopped at the maximum proximity values. After the gripper fixing parts 1300 are stopped, the specimen test unit 1000 retreats to the initial position. The outward folding load is released (outward unfolding). As only the specimen test unit 1000 retreats from the initial location to an elongation rate setting location while being separated from the guide plate unit 2000, the tensile test starts (tension loading). After then, the specimen test unit 1000 is moved forward to the initial location to release a tension load (tension unloading).

As the folding direction of the specimen is controlled, the combined load fatigue test such as 'an inward folding test-a tensile test-an outward folding test-a tensile test' or 'an outward folding test-a tensile test-an inward folding test-a tensile test', etc. can be performed, and an objective service life evaluation can be rapidly performed.

The invention claimed is:

1. A specimen testing machine comprising:
   a specimen test unit comprising: a pair of gripper parts configured to respectively hold opposite ends of a specimen, a gripper fixing part configured to fix at least any one of the pair of gripper parts, and a specimen driving part configured to move the specimen in a longitudinal direction of the specimen; and
   a guide plate unit comprising: a guide plate that is configured to be moved along with a folding direction of the specimen, and to be folded at a center portion thereof, and a second driving part comprising a second fixing part configured to fix opposite ends of the guide plate, and configured to move the specimen in the longitudinal direction of the specimen.

2. The specimen testing machine of claim 1, wherein the specimen test unit further comprises a tilting part coupled to a first side end of each of the gripper parts, and configured to control the folding direction of the specimen.

3. The specimen testing machine of claim 2, wherein the guide plate is provided at each of opposite sides based on the specimen.

4. The specimen testing machine of claim 1, wherein a rotary shaft of each of the gripper parts and a rotary shaft of the guide plate are spaced apart from each other by a predetermined distance.

5. The specimen testing machine of claim 1, wherein one side end of the gripper fixing part has a contact part that is in contact with one side end of a shaft fixing the guide plate so as to allow the guide plate to be moved together with movement of the specimen driving part.

6. The specimen testing machine of claim 1, wherein a protrusion part is provided on one surface of the guide plate that is in contact with one surface of the specimen.

* * * * *